(12) United States Patent
Li

(10) Patent No.: US 10,524,537 B2
(45) Date of Patent: Jan. 7, 2020

(54) ANTI-SPRAIN AND SHOCK-ABSORBING BALANCE SOLE AND FOOTGEAR

(71) Applicants: Zhejiang Geely Holding Group Co., Ltd., Hangzhou, Zhejiang Province (CN); Zhejiang Geely Automobile Research Institute Co., Ltd., Linhai, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Linhai, Zhejiang Province (CN)

( * ) Notice: Subject to any disclaimer, the term of this patent is extended or adjusted under 35 U.S.C. 154(b) by 19 days.

(21) Appl. No.: 15/559,059

(22) PCT Filed: Nov. 22, 2016

(86) PCT No.: PCT/CN2016/106733
§ 371 (c)(1),
(2) Date: Sep. 17, 2017

(87) PCT Pub. No.: WO2017/140150
PCT Pub. Date: Aug. 24, 2017

(65) Prior Publication Data
US 2018/0070673 A1    Mar. 15, 2018

(30) Foreign Application Priority Data
Feb. 19, 2016 (CN) .......................... 2016 1 0092166

(51) Int. Cl.
*A43B 7/24* (2006.01)
*A43B 13/18* (2006.01)
(Continued)

(52) U.S. Cl.
CPC .............. *A43B 13/181* (2013.01); *A43B 3/00* (2013.01); *A43B 7/24* (2013.01); *A43B 7/32* (2013.01);
(Continued)

(58) Field of Classification Search
CPC ......... A43B 7/24; A43B 13/12; A43B 13/182; A43B 13/183; A43B 21/30
See application file for complete search history.

(56) References Cited

U.S. PATENT DOCUMENTS 2,399,543 A    4/1946  Dack
5,282,325 A    2/1994  Beyl
(Continued)

FOREIGN PATENT DOCUMENTS

CN    201164073 Y    12/2008
CN    102396839 A    4/2012
(Continued)

*Primary Examiner* — Sharon M Prange
(74) *Attorney, Agent, or Firm* — Cheng-Ju Chiang

(57) ABSTRACT

The present invention provides an anti-sprain and shock-absorbing balance sole and a footgear including the same, the anti-sprain and shock-absorbing balance sole includes an upper sole and a lower sole, a cavity is sandwiched between the upper sole and the lower sole, multiple compressible and reboundable shock-absorbing elements are embedded in the cavity. The shock-absorbing elements in the sole can buffer the impacts from the ground to the feet, and has good shock-absorbing effect. Second, the balance beams connecting the two shock-absorbing elements in each row can provide opposite roll torque when the road is uneven or the user stamps on stones. Third, the opposite roll torque above can prevent the sole from further rolling over, therefore improves the balance stability when walking. This can further effectively prevent the occurrence of spraining, and avoid sports injury during exercises.

8 Claims, 7 Drawing Sheets

(51) Int. Cl.
  *A43B 21/30* (2006.01)
  *A43B 3/00* (2006.01)
  *A43B 7/32* (2006.01)
  *A43B 21/26* (2006.01)
  *F16F 1/00* (2006.01)

(52) U.S. Cl.
  CPC ............ *A43B 13/182* (2013.01); *A43B 21/26* (2013.01); *A43B 21/30* (2013.01); *F16F 1/00* (2013.01)

(56) References Cited

U.S. PATENT DOCUMENTS

| | | | | |
|---|---|---|---|---|
| 5,678,327 | A * | 10/1997 | Halberstadt | A43B 13/18 36/27 |
| 6,546,648 | B2 * | 4/2003 | Dixon | A43B 5/00 36/25 R |
| 6,553,692 | B1 * | 4/2003 | Chung | A43B 21/26 36/27 |
| 8,632,481 | B2 | 1/2014 | Shi et al. | |
| 2003/0200677 | A1 | 10/2003 | Abraham | |
| 2004/0068892 | A1 * | 4/2004 | Wang | A43B 13/182 36/28 |
| 2007/0277396 | A1 | 12/2007 | Swigart et al. | |
| 2008/0313928 | A1 * | 12/2008 | Adams | A43B 5/1633 36/103 |
| 2009/0282704 | A1 * | 11/2009 | Park | A43B 7/1425 36/3 B |
| 2010/0058616 | A1 * | 3/2010 | Ryoo | A43B 13/182 36/102 |
| 2012/0137541 | A1 * | 6/2012 | Yeo | A43B 13/182 36/27 |

FOREIGN PATENT DOCUMENTS

| | | | |
|---|---|---|---|
| CN | 202425703 U | 9/2012 | |
| CN | 20242577003 U | 9/2012 | |
| CN | 102742963 A | 10/2012 | |
| CN | 204273400 U | 4/2015 | |
| CN | 105559252 A | 5/2016 | |
| DE | 20312215 U1 | 12/2003 | |
| DE | 20312215 U1 | 1/2004 | |
| EP | 0552994 A1 | 7/1993 | |
| GB | 608180 A * | 9/1948 | ........... A43B 13/182 |
| JP | S53-84285 U | 12/1978 | |
| JP | 2009-100881 A | 5/2009 | |
| JP | 2009-540916 | 11/2009 | |
| WO | 2005/120271 A1 | 12/2005 | |

* cited by examiner

ANTI-SPRAIN AND SHOCK-ABSORBING BALANCE SOLE AND FOOTGEAR

CROSS REFERENCE TO RELATED APPLICATION

The present application is a 35 U.S.C. § 371 National Phase conversion of International (PCT) Patent Application No. PCT/CN2016/106733, filed on Nov. 22, 2016 and based on and claims priority of Chinese patent application No. 201610092166.X, filed on Feb. 19, 2016. The entire disclosure of the above-identified application, including the specification, drawings and claims are incorporated herein by reference in its entirety.

FIELD OF THE INVENTION

The present invention relates to a footgear field, particularly relates to an anti-sprain and shock-absorbing balance sole and to a footgear including the same.

BACKGROUND OF THE INVENTION

With the improvement of living standards, more and more people begin to think much of their health. As one of the most popular exercises, running is gradually changing people's daily leisure life. With the national rise of marathon fever, more and more young people, even middle-aged and old people, have joined the running movement, which makes the social penetration rate increasing year by year. However, running may also bring harm to one's knees or ankles. Once the harm occurred, it may take one week or even longer for the runner to recover, which will further cause physiological and psychological damages to him.

A shoe is mainly constituted by a vamp and a sole. When in use, the sole directly contacts with the ground, whether the shoe is comfortable or not mainly depends on the sole, because it is directly subjected to a friction from the ground, and simultaneously conveys a reacting stress from the ground to one's feet. Therefore, sufficient shock-absorbing is necessary for the sole, since it can effectively protects one's feet and reduces fatigue feeling, and further avoids any injury brought by exercise impact, and facilitates to realize exercise or competitive sports.

Hence, a sneaker with an air-cushion was first invented. Such sneaker can act as a buffer to the impact between the foot and the ground, and reduce the injury to one's knees or ankles. However, the air-cushion is too thick and soft, when the shoe stamps on a stone or other's foot, the sole will roll over for a certain angle, which will sprain one's ankle, commonly known as sprain ankles. Further, once the shock-absorbing seal is broken, air leaks, the shoe will lose its shock-absorbing effect.

Later, basketball shoes with a high back appeared. The high back fixes the upper of the shoes to one's shins above the ankles. Such design can decrease the rollover degree of the soles, and reduce the injury to the ankles. However, for running shoes, the most important things are their lightweight, fit and good buffer. If the running shoes are designed with the high back similar to the basketball shoes, added materials will significantly increase the total weight of the shoes, which makes the shoes suitable for running especially for long distance running.

However, current running shoes are designed especially for dry pavements such as racetracks or the like, and don't suit for normal road; further, the sole of current running shoes is hard and has low deformation, which is not good for keeping the parallel between the feet and the ground. In this way, current running shoes are inclined to sprain one's ankles.

Therefore, it is necessary to provide new running shoes, which is lightweight, fit and has better buffer, and further don't tend to sprain one's ankles during exercises.

SUMMARY OF THE INVENTION

The present invention provides an anti-sprain and shock-absorbing balance sole, which has better shock-absorbing effect, and can improve balance and stability during exercises, and can effectively prevent sprain ankles from happening and avoid sports injury.

In one embodiment of the present invention, an anti-sprain and shock-absorbing balance sole is provided, which includes an upper sole and a lower sole, a cavity is sandwiched between the upper sole and the lower sole. Multiple shock-absorbing elements are embedded in the cavity, which are compressible and reboundable. Upper ends of the multiple shock-absorbing elements connect with the upper sole, and lower ends of the multiple shock-absorbing elements connect with the lower sole. The multiple shock-absorbing elements are distributed on both sides of the sole, and every two corresponding shock-absorbing elements are in a row and are connected by a first balance.

In one embodiment, the multiple shock-absorbing elements in the sole are distributed in two lines and several rows. Multiple shock-absorbing elements of each line are independent and spaced along anterior-posterior direction, and two shock-absorbing elements of each row are connected by the first balance beam along left-to-right direction.

In another embodiment, said multiple shock-absorbing elements are merely placed at heel parts of the sole.

In yet another embodiment, said multiple shock-absorbing elements are mounted in heel parts and forefoot parts of the sole simultaneously.

In one embodiment, the first balance beam connects central sections of the two shock-absorbing elements in each row.

In another embodiment, a second balance beam connects top ends of said every two shock-absorbing elements in each row.

In one embodiment, the upper sole is made of hard materials uneasy to deform, the lower sole is made of soft materials easy to deform.

In one embodiment, a shoe-pad layer is arranged above the upper sole, and an anti-wear layer is placed under the lower sole.

In one embodiment, the multiple shock-absorbing elements are helical springs.

In one embodiment, elastic material is mounted at peripheral area of each row of the shock-absorbing elements, and the peripheral areas of rows of the shock-absorbing elements in the cavity are completely filled with the elastic materials.

In another embodiment, there is an elastic cylinder in each helical spring, and the helical springs are sheathed to the elastic cylinders, other parts of the cavity remain empty.

In still another embodiment, an elastic material is wrapped out of the periphery area of each row of the shock-absorbing elements, and the elastic material only wraps the periphery area of each row of the shock-absorbing elements for a layer, other parts in the cavity remain empty.

The present invention also provides a footgear, which includes a sole and a vamp, the vamp connects with the sole, said sole is the anti-sprain and shock-absorbing balance sole described above.

In one embodiment, the footgear also includes a power generation device, the power generation device includes a coil bushing, a permanent magnet and a battery, coils of the coil bushing connects with the battery, one of the coil bushing and the permanent magnet connects with the upper sole, and the other within the coil bushing and the permanent magnet connects with the lower sole, the coil bushing can sheathe on the permanent magnet when it moves relative to the permanent magnet.

In another embodiment, the coil bushing and the permanent magnet are mounted in the cavity of the sole, and is placed at heel parts of the sole; the battery is set in/at the vamp.

In still another embodiment, the battery is also equipped with a charging interface which is used to charge electric equipments.

Compared with conventional running shoes, the anti-sprain and shock-absorbing balance sole and the footgear described above can buffer the impacts from the ground to the feet, and have better shock-absorbing effect in the presence of the shock-absorbing element in the sole. Further, the balance beams connecting the two shock-absorbing elements in each row can provide opposite roll torque when the road is uneven or the user stamps on stones. The opposite roll torque above can prevent the sole from further rolling over, therefore improves the balance stability when walking. This can further effectively prevent the occurrence of spraining, and avoid sports injury during exercises.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1:
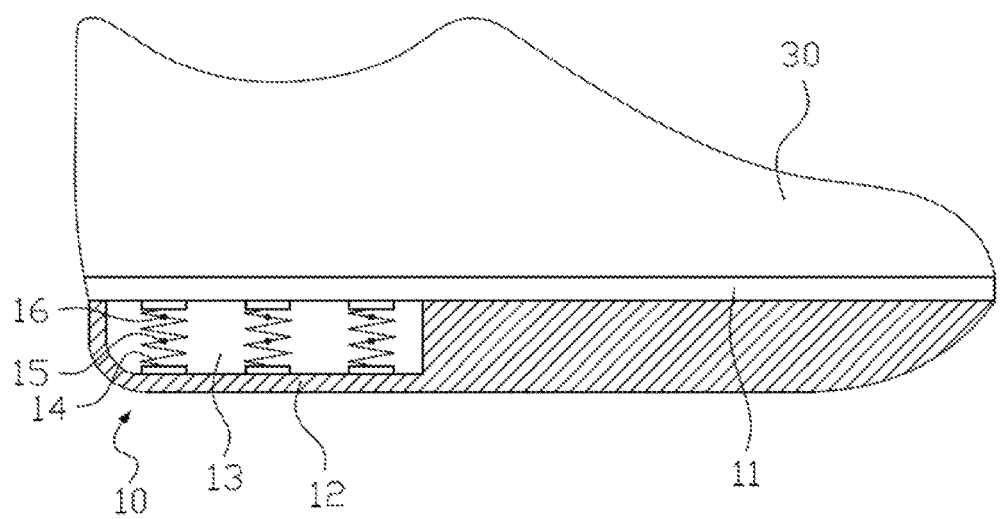
FIG. 1 illustrates a structure view of the footgear in the first embodiment of the present invention.
Figure 2:
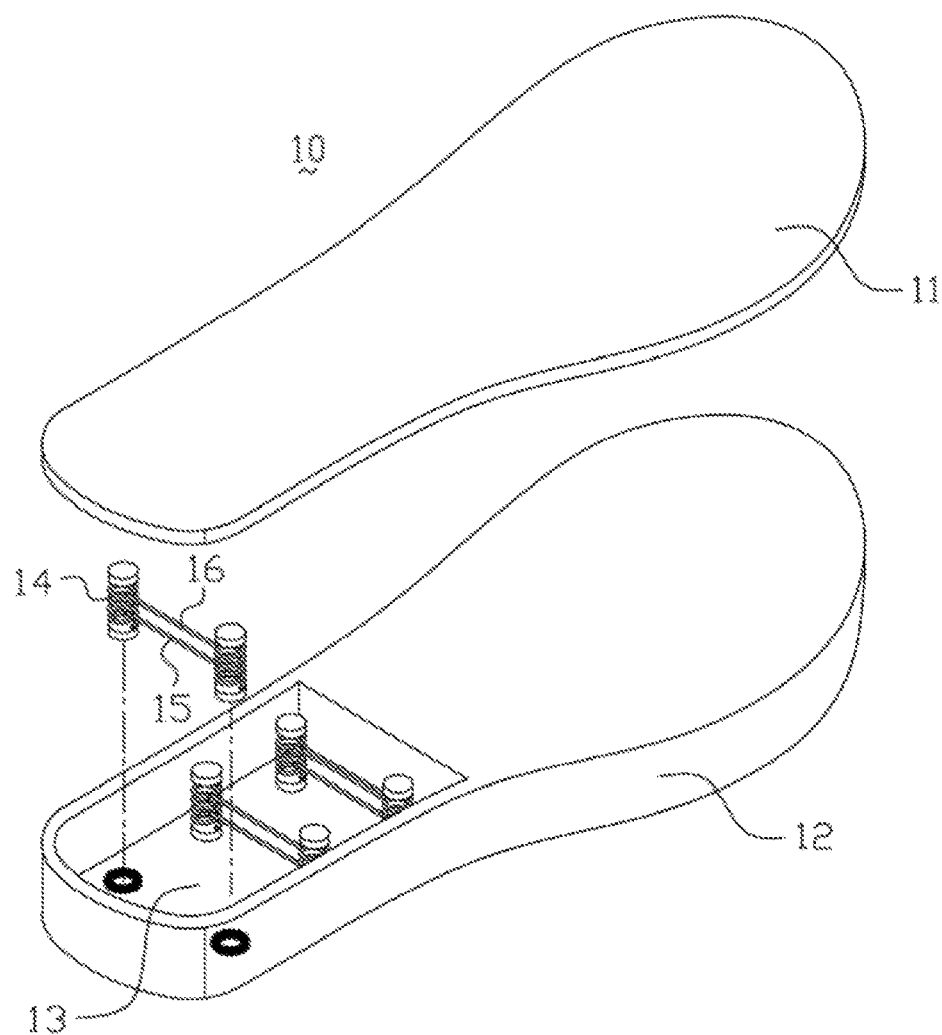
FIG. 2 illustrates an exploded schematic view of the anti-sprain and shock-absorbing balance sole of FIG. 1.

FIG. 1 illustrates a structure view of the footgear in the first embodiment of the present invention. FIG. 2 illustrates an exploded schematic view of the anti-sprain and shock-absorbing balance sole of FIG. 1. Please referring to FIGS. 1 and 2, the footgear includes a sole 10 and a vamp 30, and the vamp 30 connects with the sole 10 by means of binding or sewing. The sole 10 includes an upper sole 11 and a lower sole 12, a cavity 13 is sandwiched between the upper sole 11 and the lower sole 12. Multiple shock-absorbing elements 14 are embedded in the cavity 13, and the shock-absorbing elements 14 are compressible and reboundable. Upper ends of the multiple shock-absorbing elements 14 connect with the upper sole 11, and lower ends of the multiple shock-absorbing elements 14 connect with the lower sole 12. The multiple shock-absorbing elements 14 are distributed on both inner sides of the sole 10, and every two corresponding shock-absorbing elements 14 are in a row and are connected by a first balance beam 15. All the above constituters a shock-absorbing system. The first balance beam 15 has certain rigidity, and is made of hard thin rod such as metals or non-metals.

More concretely, as shown in FIG. 2, the multiple shock-absorbing elements 14 in the sole 10 are distributed in two lines and several rows. Multiple shock-absorbing elements 14 of each line are independent and spaced along anterior-posterior direction of the sole 10. That is, multiple shock-absorbing elements 14 in each line are independent and not connected with each other. Meanwhile, two shock-absorbing elements 14 of each row are connected by the first balance beam 15 along left-to-right direction (parallel to a row) of the sole 10.

In the embodiment, the multiple shock-absorbing elements 14 are merely embedded in heel parts of the sole 10. In this way, the shock-absorbing elements 14 endow the heel parts of the sole 10 with anti-sprain and shock-absorbing effects. FIGS. 1 and 2 show only three rows of the shock-absorbing elements 14, one skilled in the art can understand that it is not to limit the amount of the shock-absorbing elements, just for explanation purpose. The shock-absorbing system embedded in the heel parts of the sole can not only reduce the volume of the footgear, but also buffer the impact from the ground when one is running, thus absorbing the shock and protecting the runner from spraining.

In this embodiment, the first balance beam 15 connects with central section of two shock-absorbing elements 14 in each row. As shown in FIGS. 1 and 2, the central section refers to a middle height of the shock-absorbing element 14. Further, the central section also refers to an inner side of the shock-absorbing element 14. With the presence of the first balance beam 15, the shock-absorbing elements 14 can effectively buffer the impact and absorb the shock from the ground, thus can protect the runner from spraining his ankles.

Further, in another embodiment, a second balance beam 16 connects top ends of said every two shock-absorbing elements 14 in each row. The second balance beam 16 can further protect the runner from spraining his ankles due to his self reasons other than stamping on stones or uneven road. The second balance beam 16 also has certain rigidity, and is made of hard thin rod such as metals or non-metals.

In one embodiment, the multiple shock-absorbing elements 14 can be helical springs, metals or non-metals. The helical springs can be cylindrical, truncated cone-shaped, conical, truncated conical-shaped or other shapes. Two ends of the first balance beam 15 are fixed to its corresponding helical springs by means of welding, binding or integral forming; and two ends of the second balance beam 16 are also fixed to its corresponding helical springs in the same way. In another embodiment, one end (upper end) of the helical spring is fixed to the upper sole 11, and the other end (lower end) of the helical spring is fixed to the lower sole 12. To ensure the stability of the fixed connection between the helical spring and its corresponding balance beams, the upper sole 11 and/or the lower sole 12 includes a groove or a lug boss at its foxing point. An end of the helical spring is embedded and fixed into the grooves, or sheathed to the lug boss.

Figure 3:
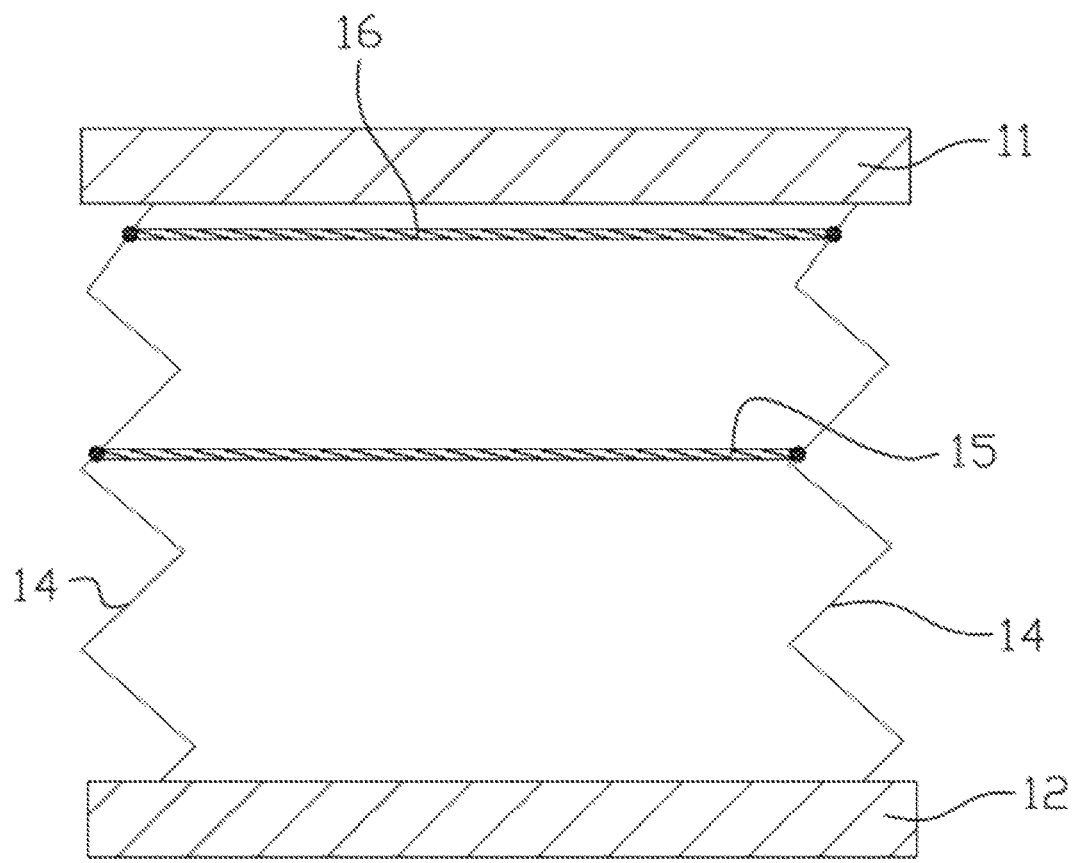
FIG. 3 is a schematic view of uncompressed shock-absorbing system of the sole in FIG. 1.
Figure 4:
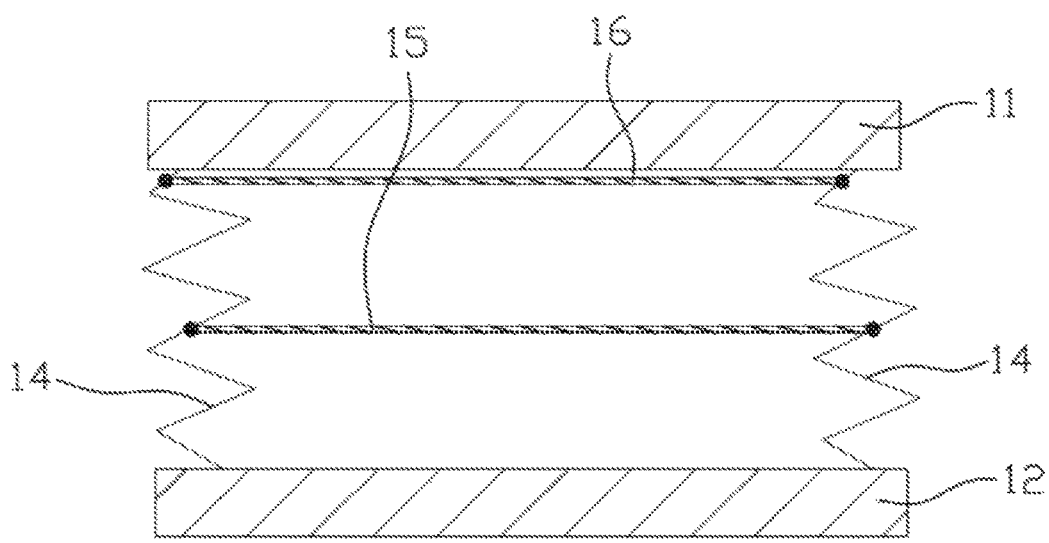
FIG. 4 is a schematic view of compressed shock-absorbing system of the sole in FIG. 1.

Referring to FIGS. 3 and 4, when the sole is applied with uniform load, the first balance beam 15 and the second balance beam 16 do not bear stress, the multiple shock-absorbing elements 14 of the sole all bear pressure with a direction vertical to the road. In this circumstance, the shock-absorbing elements 14 are normally compressed, and realize buffer and shock-absorbing effect.

Figure 5:
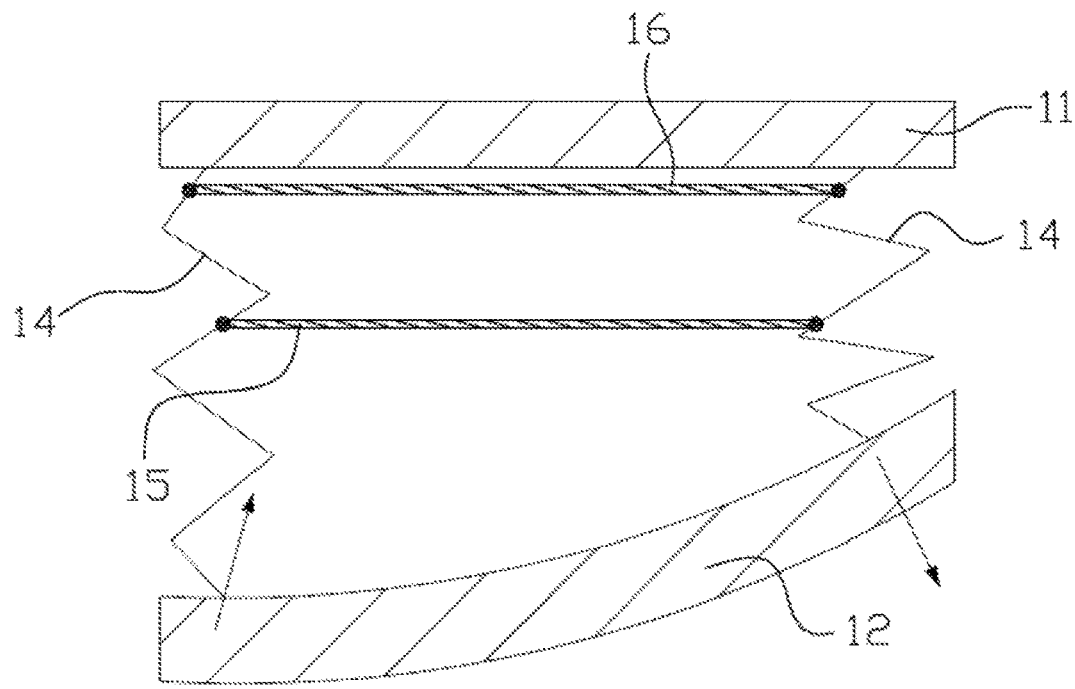
FIG. 5 is a schematic view of the shock-absorbing system of the sole in FIG. 1 when the runner stamps on uneven road.

Referring to FIG. 5, when one side of the sole 10 stamps on an object, the lower sole 12 tends to deform, that is, to roll over to the other side that does not stamp on an object. Then, the rigid first balance beam 15 will bring roll-torque opposite to the rollover trend, and the roll-torque will cause downward force to the side where the sole 10 stamps on the object, and cause upward force to the opposite side. In this way, the rollover trend will be decreased, and this can prevent the ankles of the runner from being sprained.

Figure 6:
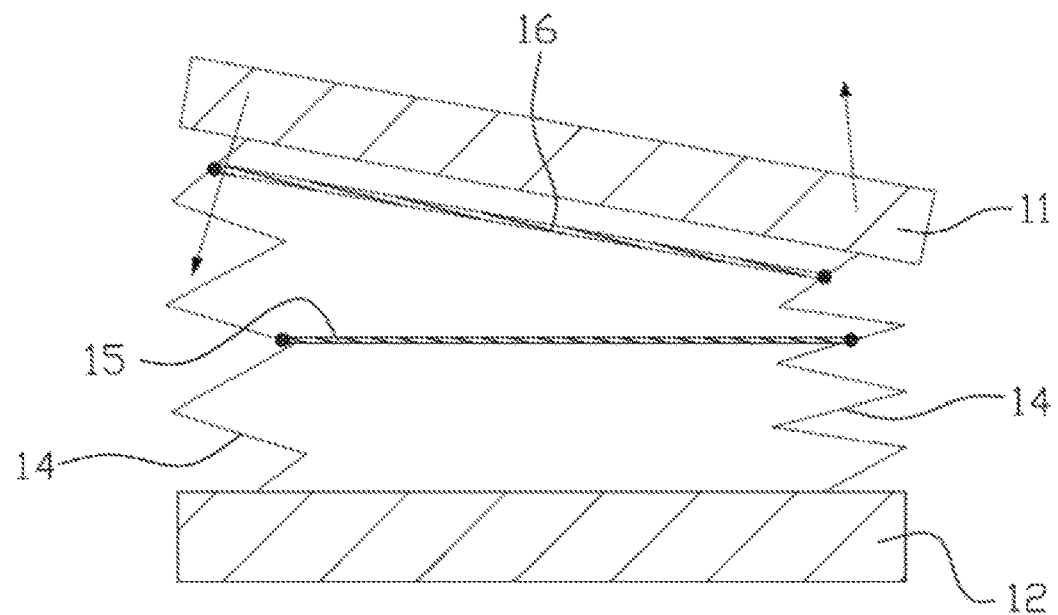
FIG. 6 is a schematic view of the shock-absorbing system of the sole in FIG. 1 when the runner loses balance.

Referring to FIG. 6, at this circumstance, the road is even, but the weight of the foot shifts to one side. Correspondingly, the upper sole 11 tends to roll over to the one side the foot shifts, which will make the second balance beam 16 to produce an upward force to the one side, and a downward force to the other side. That is, the second balance beam 16 will provide an opposite roll-torque to the upper sole 11, which will reduce the rollover tendency, and prevent the runner from spraining his ankles.

In one embodiment, the upper sole 11 is made of hard materials not easy to deform, the lower sole 12 is made of soft materials easy to deform. The material of the lower sole 12 is soft, and the first balance beam 15 also has certain elasticity, only after the elasticity reaches the limit can the sole 10 be prevented from rolling over. Hence, within the elasticity limitation, since the lower sole 12 is soft, the elasticity of the lower sole 12 and the first balance beam 15 together can keep the shoe in a horizontal level. When the lower sole 12 stamps on a bigger object, the deformation of the lower sole 12 becomes bigger, wherein the elasticity of the first balance beam 15 exceeds the limitation, at this circumstance, the first balance beam 15 can prevent the sole from rolling over, and protect the runner from spraining his ankles. Meanwhile, the upper sole 11 is made of hard material, which can maintain the horizontal bearing to the foot.

Compared with conventional shock-absorbing system of the footgear, the shock-absorbing system of the present invention has a quite opposite idea to the conventional. That is, conventional shock-absorbing system of the footgear is mounted on the side near the foot, while the shock-absorbing system of the present invention is mounted to the side near the road. In this way, the shock-absorbing system of the present invention can absorb most of the vibration from the road and can effectively avoid spraining.

The shock-absorbing system of the footgear in the embodiment can be applied in sneakers, basketball shoes, running shoes, movement leisure shoes or leather shoes. It can also be applied in height increasing shoes or high-heeled shoes. For the height increasing shoes or high-heeled shoes, the height of the heels is increased, while the heels are generally made of hard materials. These shoes will cumber the user in walking, when losing balance, spraining tends to occur. On the contrary, the shock-absorbing system of the present invention can improve the balance in walking, and avoid spraining.

Embodiment 2

Figure 7:
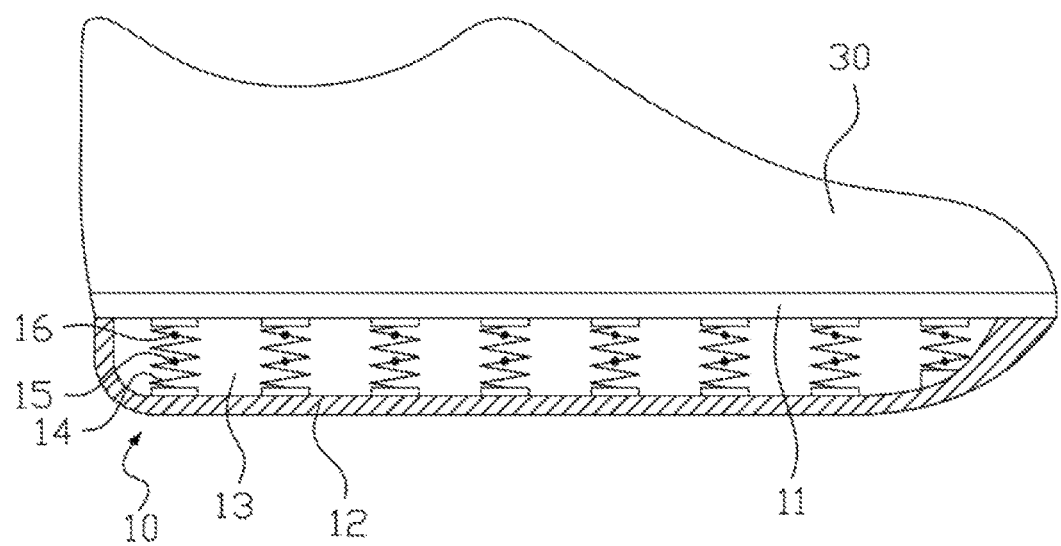
FIG. 7 illustrates a schematic view of a footgear in embodiment 2 of the present invention.
Figure 8:
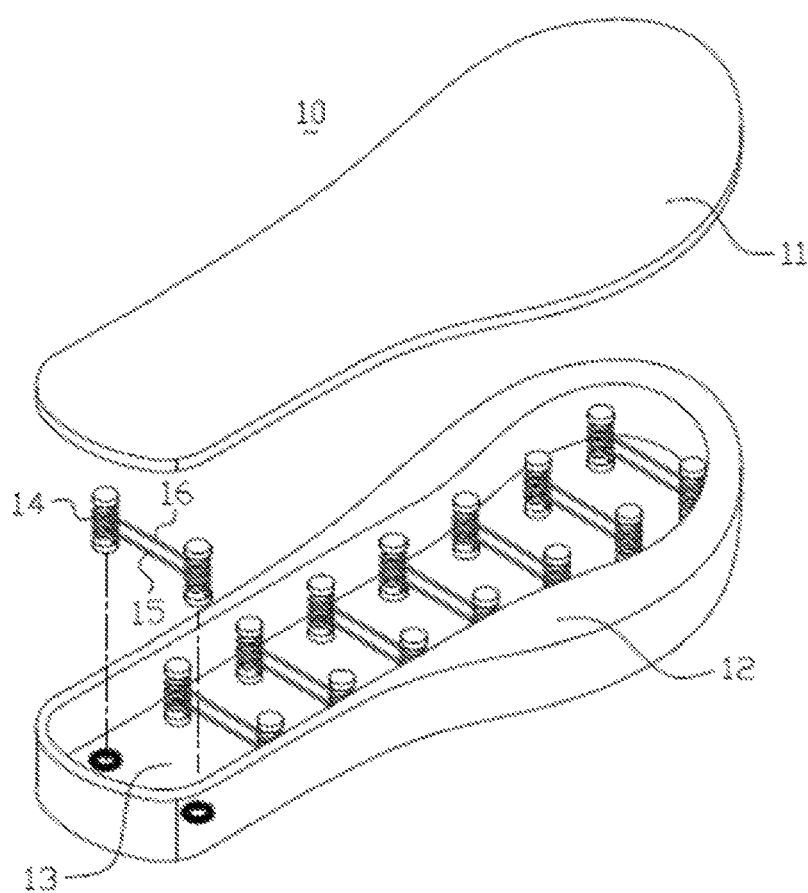
FIG. 8 is an exploded schematic view of the anti-sprain and shock-absorbing balance sole in FIG. 7.

FIG. 7 illustrates a schematic view of a footgear in embodiment 2 of the present invention. FIG. 8 is an exploded schematic view of the anti-sprain and shock-absorbing balance sole in FIG. 7. Please referring to FIGS. 1 and 8, the footgear in the embodiment is similar to that in embodiment 1, and the difference is that: in this embodiment, the shock-absorbing elements 14 are mounted in heel parts and forefoot parts of the sole 10, FIGS. 7 and 8 only show eight rows of the shock-absorbing elements 14. This design makes both the heel parts and the forefoot parts of the sole 10 have anti-sprain and shock-absorbing effect. By embedding the shock-absorbing systems into the heel parts and the forefoot parts of the sole, stresses to the feet can be dispersed to the whole sole, which can improve the situation that the stresses focus on the heels in embodiment 1. Further, the shock-absorbing system can buffer the vibration from the ground during exercises and avoid spraining, thus protects the feet of the user.

Embodiment 3

Figure 9:
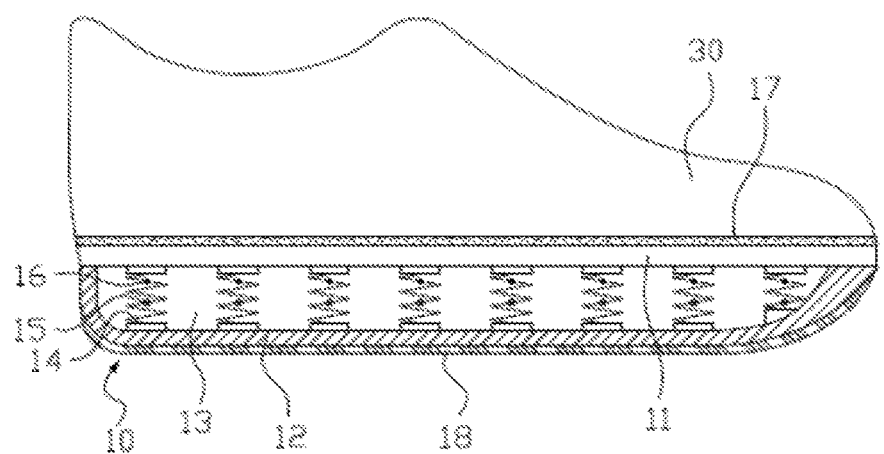
FIG. 9 illustrates a schematic view of a footgear in embodiment 3 of the present invention.

FIG. 9 illustrates a schematic view of a footgear in embodiment 3 of the present invention. Please referring to FIG. 9, the footgear in the embodiment is similar to that in embodiment 2, and the difference is that: in this embodiment, a shoe-pad layer 17 is placed above the upper sole 11, which is made of soft materials in order to increase the comfort in wearing. Meanwhile, an anti-wear layer 18 is set under the lower sole 12 in order to improve the wear resistance and slip resistance of the sole.

Embodiment 4

Figure 10:
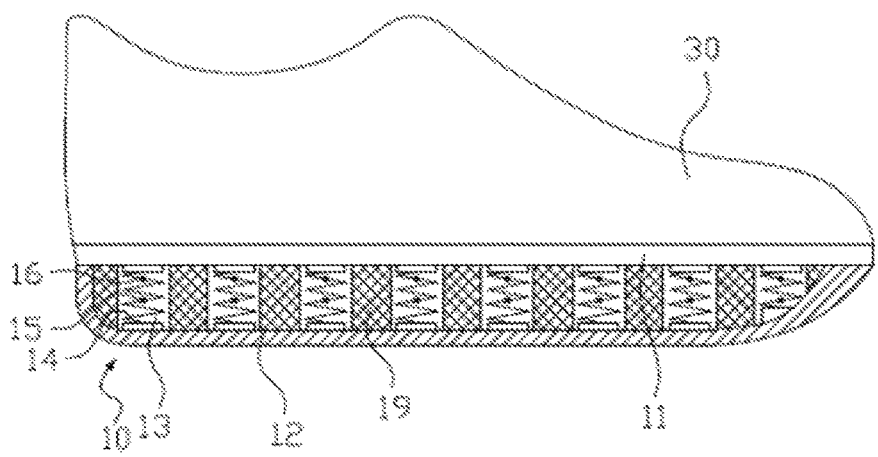
FIG. 10 illustrates a schematic view of a footgear in embodiment 4 of the present invention.
Figure 11:
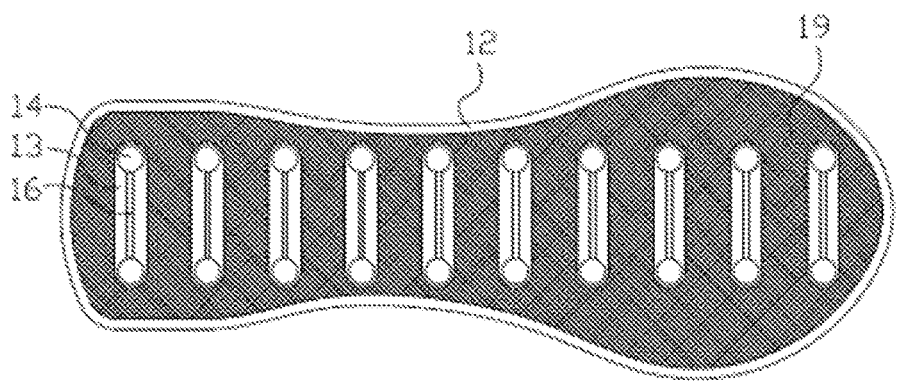
FIG. 11 illustrates a top view of a lower sole shown in FIG. 10.

FIG. 10 illustrates a schematic view of a footgear in embodiment 4 of the present invention. FIG. 11 illustrates a top view of a lower sole shown in FIG. 10. Please referring to FIGS. 10 and 11, the footgear in the embodiment is similar to that in embodiment 2, and the difference is that: in this embodiment, in the cavity 13, there are elastic materials 19 at periphery of each row of the shock-absorbing elements 14. The peripheral area of the rows of the shock-absorbing element 14 in the cavity 13 is completely filled with the elastic materials 19. The elastic material 19 is made of soft rubber materials. In one embodiment, it is made of ethylene-vinyl acetate copolymer (EVA) with good elasticity and flexibility. In this embodiment, since the periphery of the shock-absorbing elements 14 is filled with elastic material 19, stress to the feet will be more uniform, which will overcome the disadvantage that the stresses focuses on the shock-absorbing elements 14 as described in embodiments 1 and 2, and improve the stability and anti-sprain effect of the sole.

Embodiment 5

Figure 12:
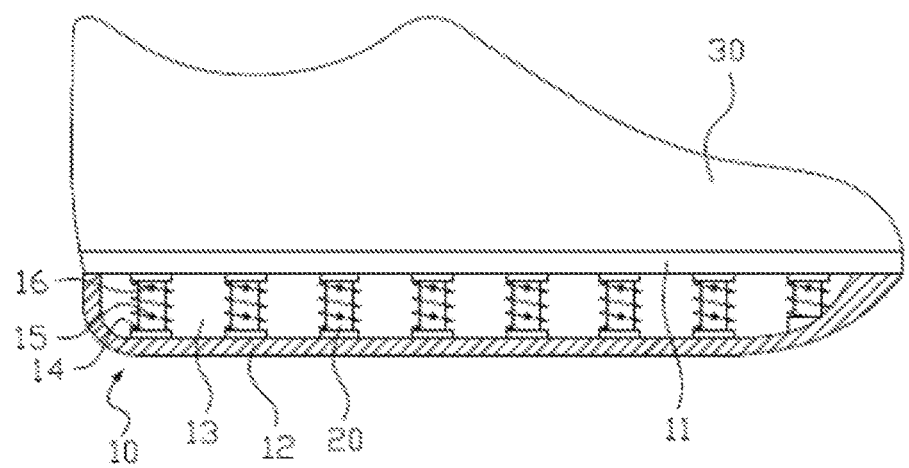
FIG. 12 illustrates a schematic view of a footgear in embodiment 5 of the present invention.
Figure 13:
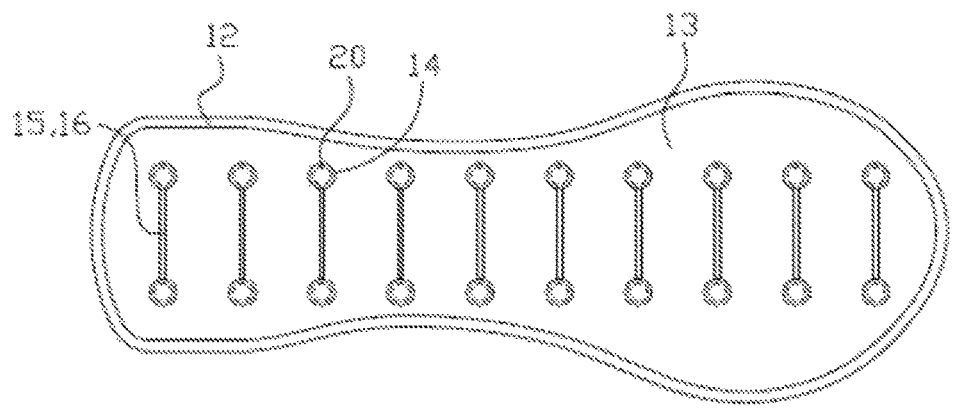
FIG. 13 illustrates a top view of a lower sole shown in FIG. 12.

FIG. 12 illustrates a schematic view of a footgear in embodiment 5 of the present invention. FIG. 13 illustrates a top view of a lower sole shown in FIG. 12. Please referring to FIGS. 12 and 13, the footgear in the embodiment is similar to that in embodiment 2, and the difference is that: in this embodiment, in the cavity 13, there is an elastic cylinder 20 in each helical spring. The helical springs, acting as the shock-absorbing element 14, are sheathed to the elastic cylinder 20. Other parts of the cavity 13 remain empty (not shown). The elastic cylinder 20 is made of soft rubber materials. In one embodiment, it is made of ethylene-vinyl acetate copolymer (EVA) with good elasticity and flexibility. In this embodiment, the helical spring acting as the shock-absorbing element 14 is sheathed to the elastic cylinder 20, and the elastic cylinder 20 can provide guidance for the compression and rebound movement of the helical spring, thus improve the stability and anti-sprain effect of the sole.

Embodiment 6

Figure 14:
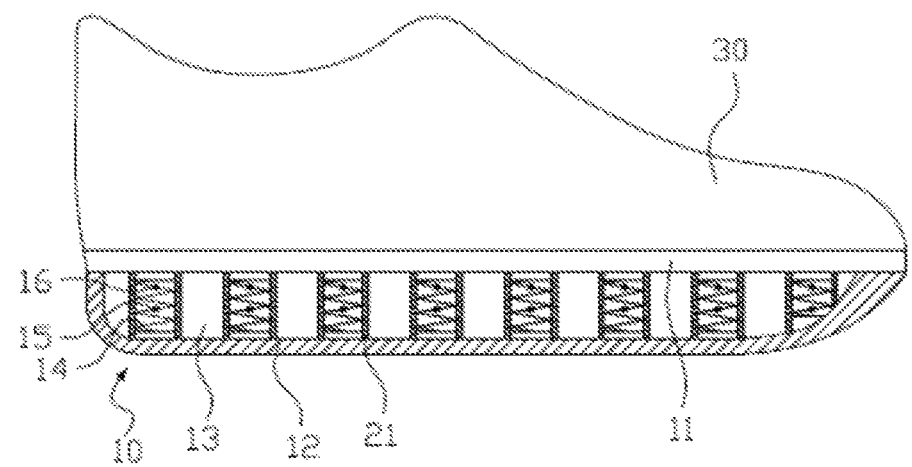
FIG. 14 illustrates a schematic view of a footgear in embodiment 6 of the present invention.
Figure 15:
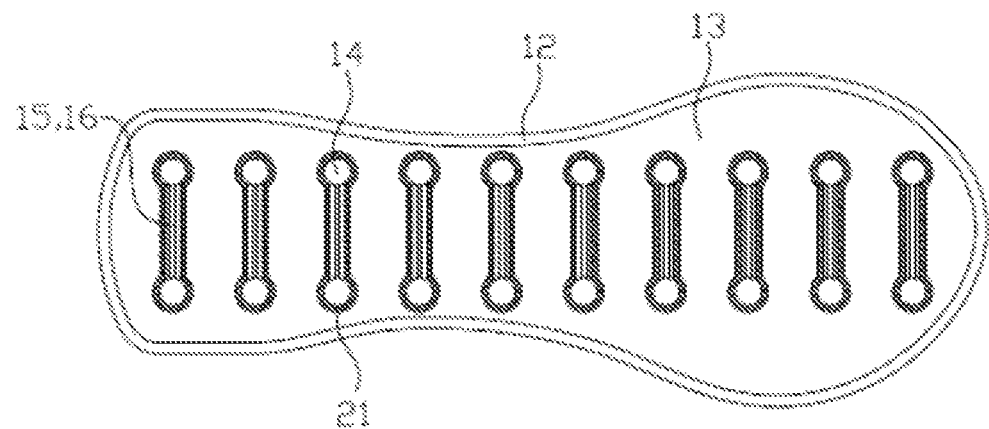
FIG. 15 illustrates a top view of a lower sole shown in FIG. 14.

FIG. 14 illustrates a schematic view of a footgear in embodiment 6 of the present invention. FIG. 15 illustrates a top view of a lower sole shown in FIG. 14. Please referring to FIGS. 14 and 15, the footgear in the embodiment is similar to that in embodiment 2, and the difference is that: in this embodiment, in the cavity 13, an elastic material 21 is wrapped out of the periphery of each row of the shock-absorbing elements 14, and other parts of the cavity 13 is empty (not shown). In one embodiment, the elastic material 21 there is only one layer of the elastic material 21 wrapped out of the periphery of each row of the shock-absorbing elements 14. The elastic material 21 is made of soft rubber material. In one embodiment, it is made of ethylene-vinyl acetate copolymer (EVA) with good elasticity and flexibility. In this embodiment, the periphery of the shock-absorbing elements 14 is wrapped with elastic material 21, the elastic material 21 confines a boundary for the shock-absorbing elements 14 and provides guidance for the up and down expansion of them, therefore improves the stability and anti-sprain effect of the sole.

Embodiment 7

Figure 16:
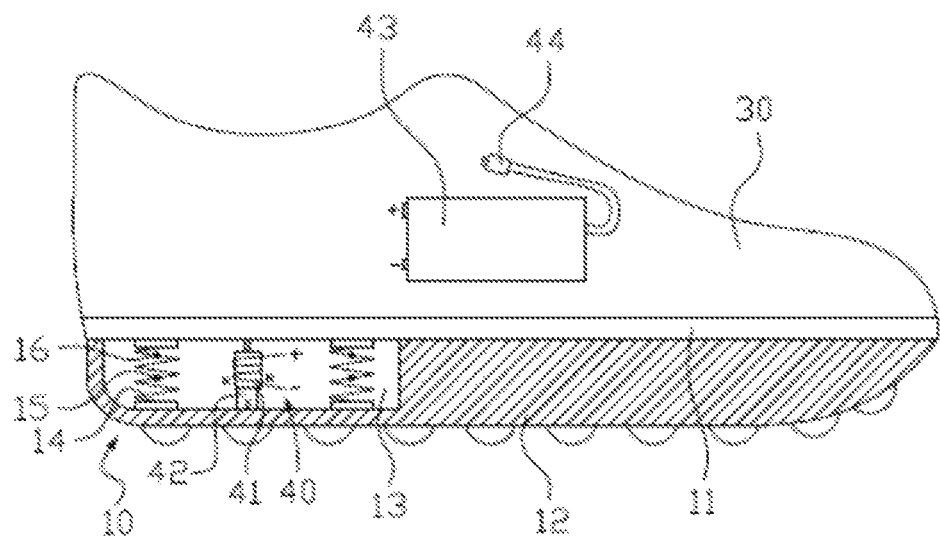
FIG. 16 illustrates a schematic view of a footgear in embodiment 7 of the present invention.

FIG. 16 illustrates a schematic view of a footgear in embodiment 7 of the present invention. Referring to FIG. 16, the footgear in the embodiment is similar to that in embodiment 1 or embodiment 2. In embodiments 1 and 2, the shock-absorbing systems make the sole to reciprocate. The difference between embodiment 7 and embodiments 1 and 2 is that: based on the features above, there is a reciprocating piezoelectric power generation device 40 at the heel part and/or the forefoot part in this embodiment. During walking, the reciprocation of the heel part can make the power generation device 40 to self-power. Further, a battery 43, such as a lithium battery, is placed at/in the vamp 30. The anode and cathode of the battery 43 are electrically connected with that of the power generation device 40 separately, and the power generation device 40 will charge the battery 43. In one embodiment, the battery 43 is also equipped with a charging interface 44 (such as USB charger). It can charge the electric equipment such as mobile phones in emergency.

The power generation device 40 includes a coil bushing 41 and a permanent magnet 42, the coil of the coil bushing 41 connects with the battery 43. One of the coil bushing 41 and the permanent magnet 42 connects the upper sole 11, and the other within the coil bushing 41 and the permanent magnet 42 connects with the lower sole 12. That is, if the coil bushing 41 connects with the upper sole 11, the permanent magnet 42 connects with the lower sole 12; if the permanent magnet 42 connects with the upper sole 11, the coil bushing 41 connects with the lower sole 12. In one embodiment, the coil bushing 41 connects with the upper sole 11, and the permanent magnet 42 connects with the lower sole 12. At this circumstance, the relative movement between the upper sole 11 and the lower sole 12 will drive the coil bushing 41 to move relatively to the permanent magnet 42, and make the coil bushing 41 sheathed on the permanent magnet 42. The reciprocation between the coil bushing 41 and the permanent magnet 42 will cut the magnetic lines and generate electricity. The above mentioned shock-absorbing system acts as returning device of the reciprocating piezoelectric power generation device 40, which including the shock-absorbing elements 14 and the balance beams 15 and 16.

As shown by the description above, the embodiments of the present invention provides an anti-sprain and shock-absorbing balance sole and a footgear including the same, and achieves the following technical effects. First, the shock-absorbing elements in the sole can buffer the impacts from the ground to the feet, and has good shock-absorbing effect. Second, the balance beams connecting the two shock-absorbing elements in each row can provide opposite roll torque when the road is uneven or the user stamps on stones. Third, the opposite roll torque above can prevent the sole from further rolling over, therefore improves the balance stability when walking. This can further effectively prevent the occurrence of spraining, and avoid sports injury during exercises.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An anti-sprain and shock-absorbing balance sole, comprising an upper sole and a lower sole, a cavity is sandwiched between the upper sole and the lower sole, multiple compressible and reboundable shock-absorbing elements are embedded in the cavity, upper ends of the multiple shock-absorbing elements connect with the upper sole, and lower ends of the multiple shock-absorbing elements connect with the lower sole, wherein the multiple shock-absorbing elements are distributed on both sides of the sole, and every two corresponding shock-absorbing elements are in a row along a left-to-right direction of the sole, and are connected by a first balance beam along the same direction; the first balance beam is made of hard thin rod, the multiple shock-absorbing elements are helical springs, two ends of the first balance beam are fixed to its corresponding helical springs in the row along the same left-to-right direction; an elastic material is wrapped around a periphery area of each row of the shock-absorbing elements, and the elastic material only wraps the periphery area of each row of the shock-absorbing elements for a layer, other parts in the cavity remain empty; the first balance beam is also wrapped by the elastic material to be within the periphery area.

2. The anti-sprain and shock-absorbing balance sole of claim 1, wherein the multiple shock-absorbing elements in the sole are distributed in two lines and several rows, the multiple shock-absorbing elements in each line are independent and spaced along anterior-posterior direction of the sole, and two shock-absorbing elements of each row are connected by the first balance beam along left-to-right direction of the sole.

3. The anti-sprain and shock-absorbing balance sole of claim 1, wherein the multiple shock-absorbing elements are mounted in heel parts and forefoot parts of the sole.

4. The anti-sprain and shock-absorbing balance sole of claim 1, wherein the first balance beam connects with central sections of two shock-absorbing elements in each row.

5. The anti-sprain and shock-absorbing balance sole of claim 1, wherein a second balance beam connects top ends of said every two shock-absorbing elements in each row.

6. The anti-sprain and shock-absorbing balance sole of claim 1, wherein the upper sole is made of hard materials uneasy to deform, the lower sole is made of soft materials easy to deform.

7. The anti-sprain and shock-absorbing balance sole of claim 1, wherein a shoe-pad layer is placed above the upper sole, an anti-wear layer is set under the lower sole.

8. A footgear, comprising a sole and a vamp, the vamp connects with the sole, wherein the sole is an anti-sprain and shock-absorbing balance sole as described by claim 1.

* * * * *